Oct. 30, 1923.

A. C. MACBETH 1,472,608

MOTION PICTURE MACHINE

Filed July 3, 1922

INVENTOR
Albert C. Macbeth
BY
Pierre Barnes
ATTORNEY

Patented Oct. 30, 1923.

1,472,608

UNITED STATES PATENT OFFICE.

ALBERT C. MACBETH, OF SEATTLE, WASHINGTON, ASSIGNOR OF ONE-HALF TO CHARLES T. ORANGE, OF SEATTLE, WASHINGTON.

MOTION-PICTURE MACHINE.

Application filed July 3, 1922. Serial No. 572,382.

*To all whom it may concern:*

Be it known that I, ALBERT C. MACBETH, a citizen of the United States, residing at Seattle, in the county of King and State of Washington, have invented certain new and useful Improvements in Motion-Picture Machines, of which the following is a specification.

This invention relates to apparatus for exhibiting motion pictures stereoscopically.

The general object of my invention is to provide improved and efficient means whereby photographic images taken from opposite sides of the focal axis of a camera will be displayed in relief upon a screen as a composite picture having a semblance of reality.

More specific objects and advantages of the invention will appear in the following description.

The invention consists in the novel method and means substantially as hereinafter described for reproducing pictures stereoscopically upon a screen.

In the accompanying drawings,—

Figure 1:
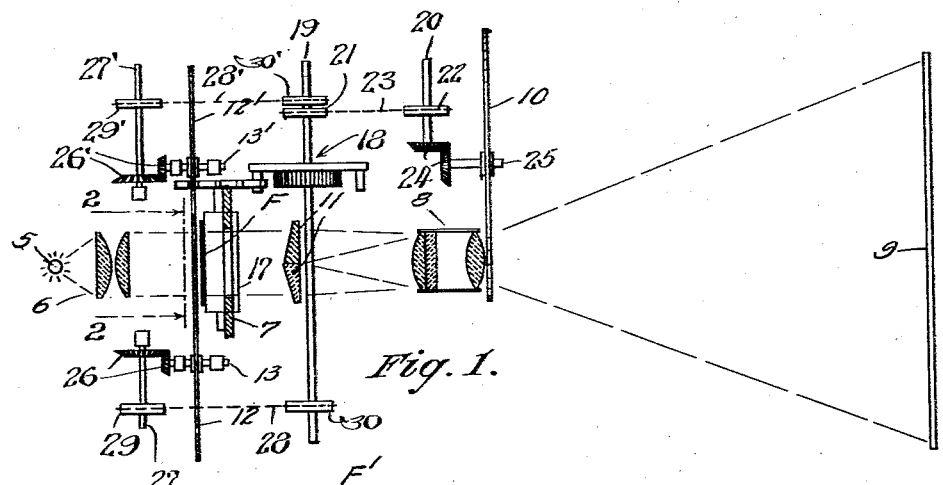
Figures 2, 3:
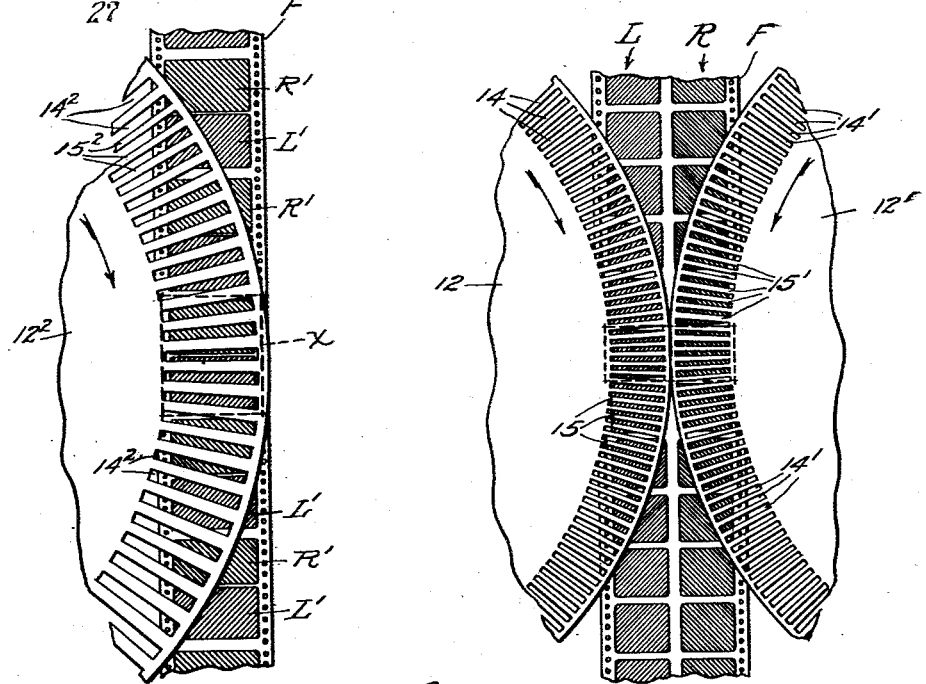
Figure 4:
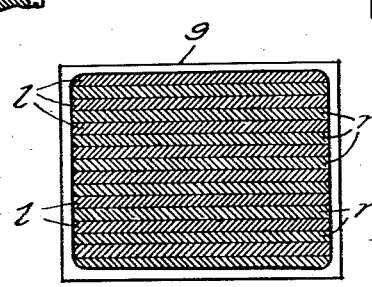

Figure 1 is a view, shown somewhat diagrammatically, of apparatus illustrating my invention. Fig. 2 is a fragmentary transverse vertical section through 2—2 of Fig. 1 showing to an enlarged scale the preferred construction of the picture distributing devices associated with a picture film upon which the complementary right and left images are arranged side by side. Fig. 3 is a view similar to Fig. 2 of a distributor adapted for use in connection with a film as shown and upon which the right and left images are arranged alternately one above the other. Fig. 4 is a front elevational view of a screen upon which a composite picture is represented by alternating horizontal bars.

The positive films employed with the present invention may be produced from negatives made by any known or suitable stereoscopic camera.

In Fig. 2, the film indicated by F, is provided with vertical rows of left and right hand images respectively indicated by L and R in which complementary or concurrent exposures are shown in horizontal relations.

In Fig. 3 the film $F^1$ is provided with pairs of concurrently taken left and right hand images indicated by $L^1$ and $R^1$.

In Fig. 1 the reference numeral 5 represents the source of light; 6, the condenser lens; F, the film; 7, a partition with an object aperture therein; 8, the projector; 9, the screen; and 10, the shutter of a kinetoscope. The film is driven intermittently to successively present before the object aperture pairs of complementary exposures, that is—right and left hand images which were simultaneously photographed—and arranged as indicated in either Figs. 2 or 3. 11 represent deflecting prisms for directing to the projector 8 the light rays passing through the complementary images of each successive pair of film exposures.

The shutter 10, which may be of any known or suitable type, functions to eliminate flicker by preventing the picture being projected upon the screen 9 while the film is in motion.

According to this invention, the film images are projected fragmentarily to produce a composite screen picture formed of strips or lines simultaneously derived from the right and left hand film exposures and in alternate relations with each other. As illustrated for use with a film provided with two rows of exposure, see Figs. 1 and 2, I provide two disks 12 and $12^1$ disposed transversely of the kinetoscope and mounted upon parallel shafts 13 and $13^1$ which are driven as indicated by arrows in Fig. 2 synchronously at high speeds by any known mechanism of the kinetoscope. As one form of means for driving the film and the disks, a driving reel 17 for the film F is afforded intermittent rotary motion as by means of a Geneva movement, denoted by 18, from a driving shaft which, as illustrated, also serves to rotate a second shaft 20 through the medium of sprocket wheels 21—22 and a chain belt 23. Motion, in turn, is transmitted from the shaft 20 through the medium of gear wheels 24 to the arbor 25 of shutter 10 to rotate the latter. With a film provided with two rows of exposures L and R, as indicated in Fig. 2, the arbors 13 and 13′ of the disks 12 and 12′ are driven at high speed in directions indicated by arrows in Fig. 2. As shown in Fig. 1, the arbors 13—13' are rotated through the medium of gear wheels 26, 26' from intermediate shafts 27, 27' which are driven by endless belts as indicated by 28, 28', passing about sprocket wheels 29, 29' and 30, 30' respectively on said intermediate shafts and the driving shaft 19. Said disks are respectively provided with peripherally arranged slots 14 and 14¹, preferably disposed radially of the disk axes, the adjacent slots of the respective series being separated by bars 15 and 15¹ of widths substantially equal to the widths of the slots. The disks, moreover, are controlled to have the slots of one disk be in alignment, or nearly so, with the bar elements of the other disk when traversing the projecting light beam whereby the illuminated portions of complementary left and right exposures are interspersed upon the screen.

This will be understood from an inspection of Fig. 4 wherein the projections upon the screen at any instant are represented by differently inclined hatching.

By reason of the revolutions of the distributor slots and bar elements the positions of the right and left projections $r$ and $l$ upon the screen are changing one for the other to afford a motion picture composed of dissolving or blending portions. In Fig. 3, is illustrated a distributor consisting of a single disk 12² provided with a series of peripherally arranged alternating slots 14² and bar elements 15² which are arranged to coincidently expose and mask respectively similarly located portions of the pair of right and left hand exposures of the film F¹ which are in the picture projecting light beam whose outline is indicated by dotted lines $x$ in Fig. 3.

The invention will, it is thought, be understood from the foregoing description.

What I claim, is,—

1. In a stereoscopic motion picture machine, a film provided with pairs of complementary complete pictures taken from two different view points, and regulating means whereby fractional portions of the complementary complete pictures of each pair thereof are simultaneously exhibited in alternate relations with each other.

2. In a stereoscopic motion picture machine, a film provided with pairs of complementary complete pictures taken from two different view points, and regulating means whereby alternate portions of both pictures of each pair thereof are exhibited simultaneously on a screen to afford a composite picture upon the latter.

3. In a stereoscopic motion picture machine, a film having thereon complementary complete pictures taken from two different view points, a rotary disk provided with apertures disposed to be revolubly carried in proximity to the film, said apertures being arranged to simultaneously expose in multiple spaced portions of two complementary film pictures.

4. In a stereoscopic motion picture machine, a film provided with series of pictures taken from two view points, each picture taken from a single view point, a shutter cooperating therewith, and picture projecting regulating means comprising a rotary disk provided with circumferentially disposed spaced apertures arranged to alternately and interchangeably expose and mask adjacent portions of successive pictures of each and both series thereof.

5. In a stereoscopic motion picture machine, a film provided with pairs of complementary complete pictures taken from two different view points, and regulating means whereby a plurality of spaced fractional portions of one picture of each pair are exhibited simultaneously with the alternate portions of the complementary picture of the pair.

Signed at Seattle, Washington, this 26th day of June 1922.

ALBERT C. MACBETH.

Witnesses:
PIERRE BARNES,
MARGARET G. SUPPLE.